(12) United States Patent
Bourgeois (10) Patent No.: US 9,204,754 B1
(45) Date of Patent: Dec. 8, 2015

(54) MULTI-USE OUTDOOR COOKER FOR SELECTIVELY FRYING, BOILING OR STEAMING FOOD ITEMS

(75) Inventor: Norman Bourgeois, Jefferson, LA (US)

(73) Assignee: METAL FUSION, INC., Jefferson, LA (US)

( * ) Notice: Subject to any disclaimer, the term of this patent is extended or adjusted under 35 U.S.C. 154(b) by 21 days.

(21) Appl. No.: 12/818,351

(22) Filed: Jun. 18, 2010

Related U.S. Application Data

(60) Provisional application No. 61/218,748, filed on Jun. 19, 2009.

(51) Int. Cl.
*A47J 37/07* (2006.01)
*A47J 37/06* (2006.01)

(52) U.S. Cl.
CPC .................... *A47J 37/0611* (2013.01)

(58) Field of Classification Search
CPC ....... A23L 1/0107; A23L 1/0026; A23L 1/01; A23L 1/0121; A47J 37/0611; A47J 37/0704; A47J 37/041; A47J 37/0786; A47J 37/0713
USPC .......... 99/340, 330, 336, 339, 353, 354, 357, 99/371, 376–377, 379, 382, 393, 394, 99/402–403, 410, 415–418, 421 R, 421 A
See application file for complete search history.

(56) References Cited

U.S. PATENT DOCUMENTS

| | | | |
|---|---|---|---|
| 878,271 A * | 2/1908 | Blackford | 211/125 |
| 3,931,758 A * | 1/1976 | Blake | 99/419 |
| 4,162,650 A * | 7/1979 | Davis et al. | 99/419 |
| 4,380,192 A * | 4/1983 | Doren | 99/441 |
| 4,735,135 A * | 4/1988 | Walker | 99/424 |
| 5,065,735 A | 11/1991 | Bourgeois et al. | |
| 5,117,558 A * | 6/1992 | Hull | 30/323 |
| 5,813,321 A | 9/1998 | Bourgeois | |
| 5,970,852 A | 10/1999 | Bourgeois | |
| 6,058,830 A | 5/2000 | Bourgeois | |
| 6,104,017 A * | 8/2000 | Kim et al. | 219/732 |
| 6,314,869 B1 | 11/2001 | Bourgeois, Jr. | |
| 6,439,107 B1 | 8/2002 | Bourgeois | |

(Continued)

FOREIGN PATENT DOCUMENTS

DE 202007011387 U1 * 11/2007

*Primary Examiner* — Dana Ross
*Assistant Examiner* — Ket D Dang
(74) *Attorney, Agent, or Firm* — Garvey, Smith Nehrbass & North, L.L.C.; Charles C. Garvey, Jr.; Vanessa M. D'Souza (57) ABSTRACT

An outdoor cooking vessel apparatus enables a user to selectively fry, boil or steam food items by reconfiguring the apparatus. The apparatus employs a cooking vessel having a bottom wall, side wall, an open top and a vessel interior. A basket is sized and shaped to fit the vessel interior. The basket having a bottom with an inner surface and an outer surface. A skewer rack is connectable to the basket bottom panel. The rack is connectable to the bottom panel inner surface for skewering the food items to be cooked in the basket interior when the basket occupies the vessel interior. The rack is connectable to the basket bottom outer surface wherein the skewer rack supports the basket in an elevated position above the cooking vessel bottom. The basket enables items to be cooked within the basket when the basket occupies the vessel interior and wherein the skewer rack is not connected to the basket such as when frying large items (for example, turkey).

10 Claims, 12 Drawing Sheets

(56) References Cited

U.S. PATENT DOCUMENTS

| | | | |
|---|---|---|---|
| 6,698,335 B1 * | 3/2004 | Bourgeois | 99/340 |
| 6,711,992 B1 * | 3/2004 | McLemore | 99/413 |
| 6,957,649 B1 | 10/2005 | Bourgeois | |
| 6,964,273 B1 | 11/2005 | Bourgeois | |
| 7,237,476 B1 * | 7/2007 | Bourgeois et al. | 99/340 |
| 7,237,547 B1 | 7/2007 | Bourgeois | |
| 7,325,482 B1 | 2/2008 | Bourgeois et al. | |
| 7,707,929 B1 * | 5/2010 | Bourgeois et al. | 99/340 |
| 2005/0279223 A1 * | 12/2005 | McPeak | 99/419 |

* cited by examiner

MULTI-USE OUTDOOR COOKER FOR SELECTIVELY FRYING, BOILING OR STEAMING FOOD ITEMS

CROSS-REFERENCE TO RELATED APPLICATIONS

Priority of U.S. Provisional Patent Application Ser. No. 61/218,748, filed Jun. 19, 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an outdoor cooking apparatus that can be transformed or reconfigured to enable a user to selectively fry, boil or steam food items to be prepared.

2. General Background of the Invention

Several patents have issued to applicant that are directed to outdoor cooking devices. Those patents are listed in the following table.

TABLE

| PAT. NO. | TITLE | ISSUE DATE |
| --- | --- | --- |
| 5,065,735 | Convertible Burner Apparatus | Nov. 19, 1991 |
| 5,813,321 | Gas Fired Outdoor Cooking Apparatus for Selectively Boiling or Steaming Food Items | Sep. 29, 1998 |
| 5,970,852 | Gas Fired Outdoor Cooking Apparatus for Selectively Boiling or Steaming Food Items | Oct. 26, 1999 |
| 6,058,830 | Gas Fired Outdoor Cooking Apparatus | May 9, 2000 |
| 6,314,869 | Outdoor Cooking Apparatus | Nov. 13, 2001 |
| 6,439,107 | Gas Fired Outdoor Cooking Apparatus | Aug. 27, 2002 |
| 6,698,335 | Gas Fired Outdoor Cooking Apparatus | Mar. 2, 2004 |
| 6,957,649 | Gas Fired Outdoor Cooking Apparatus | Oct. 25, 2005 |
| 6,964,273 | Outdoor Cooking Apparatus | Nov. 15, 2005 |
| 7,237,476 | Outdoor Cooking Apparatus | Jul. 3, 2007 |
| 7,237,547 | Outdoor Cooking Apparatus | Jul. 3, 2007 |
| 7,325,482 | Outdoor Cooking Apparatus | Feb. 5, 2008 |

BRIEF SUMMARY OF THE INVENTION

The apparatus of the present invention provides an outdoor cooking apparatus that includes a cooking vessel having a bottom wall, side wall, open top and vessel interior.

A basket is sized and shaped to fit the vessel interior, the basket having a bottom or bottom panel with an inner surface and an outer surface. A skewer rack is connectable to the basket bottom panel. The skewer rack can be selectively connected to either the inner surface or the outer surface of the bottom panel of the basket.

When the skewer rack is connected to the basket bottom panel inner surface, the rack can be used for skewering food items to be fried in the basket interior when the basket occupies the vessel interior.

When the rack is connected to the basket bottom outer surface, the skewer rack supports the basket in an elevated position above the cooking vessel bottom for steaming food items in the basket.

The basket enables items to be boiled within the basket when the basket occupies the vessel interior and wherein the skewer rack is connected to or not connected to the basket.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-9 show a preferred embodiment of the apparatus of the present invention designated generally by the numeral 10. Cooking apparatus 10 employs a pot 11 having a bottom or bottom wall 12 and a side wall 13. Pot 11 has an open top 14 for receiving a basket 17 and/or a skewer rack 30. Pot 11 has opposed handles 15 that enable the pot to be lifted such as when placing it on or removing it from a burner. The pot 11 has a pot height 16.

Basket 17 provides a bottom or bottom panel 18 and a side or side wall 19. Both the bottom panel 18 and side wall 19 are perforated with openings or perforations 20. Basket 17 is fitted with a pair of handles 21, each handle being at an end portion of basket 17 as shown. Each handle provides a hook or inverted hook 22. The hook 22 is connected to a pair of arms 23, 24. Each arm 23, 24 is attached to a generally vertically extending flange. Arm 23 is attached to flange 25. Arm 24 is attached to flange 26.

Each of the flanges 25, 26 is provided with a plurality of spaced apart openings 27. These openings 27 enable a fastener or bolted connection 28 to attach the particular flange 25 or 26 to side wall 19 of basket 17. Basket 17 provides basket adjustment openings 29 (see FIG. 2).

Figure 9:
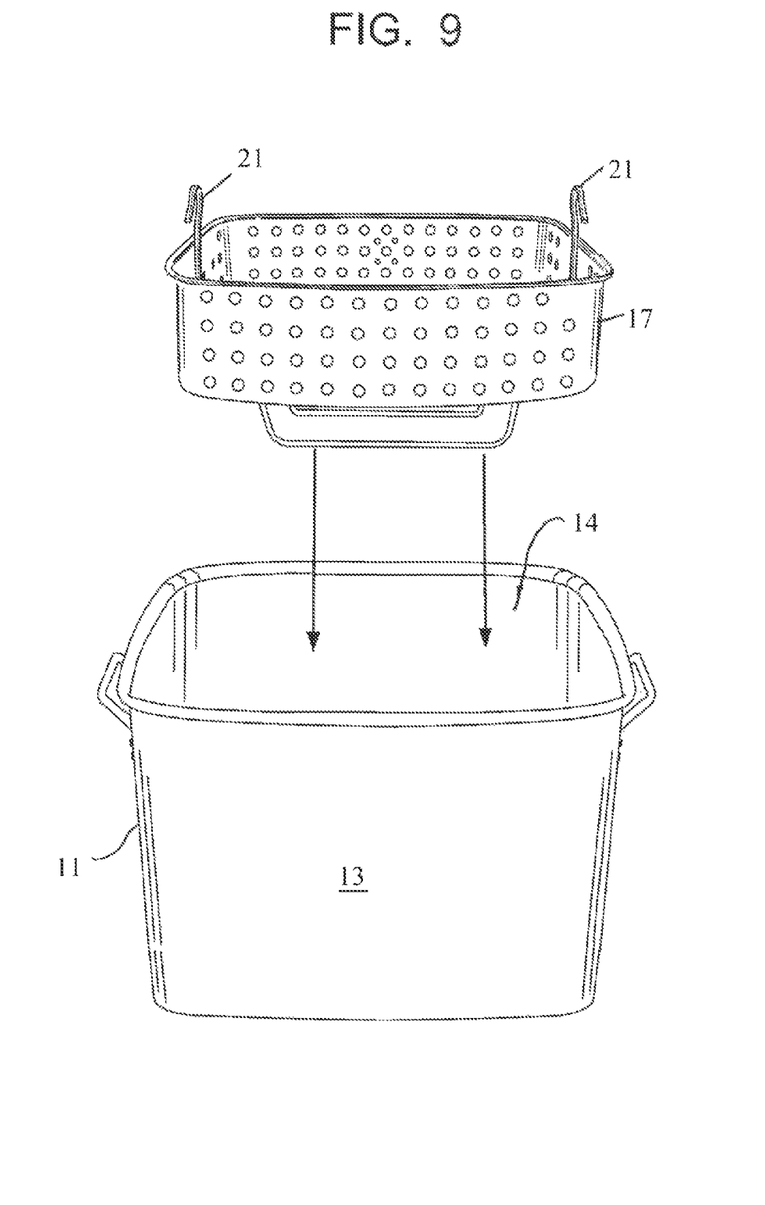
FIG. 9 is a perspective exploded view of a preferred embodiment of the apparatus of the present invention.
Figure 10A:
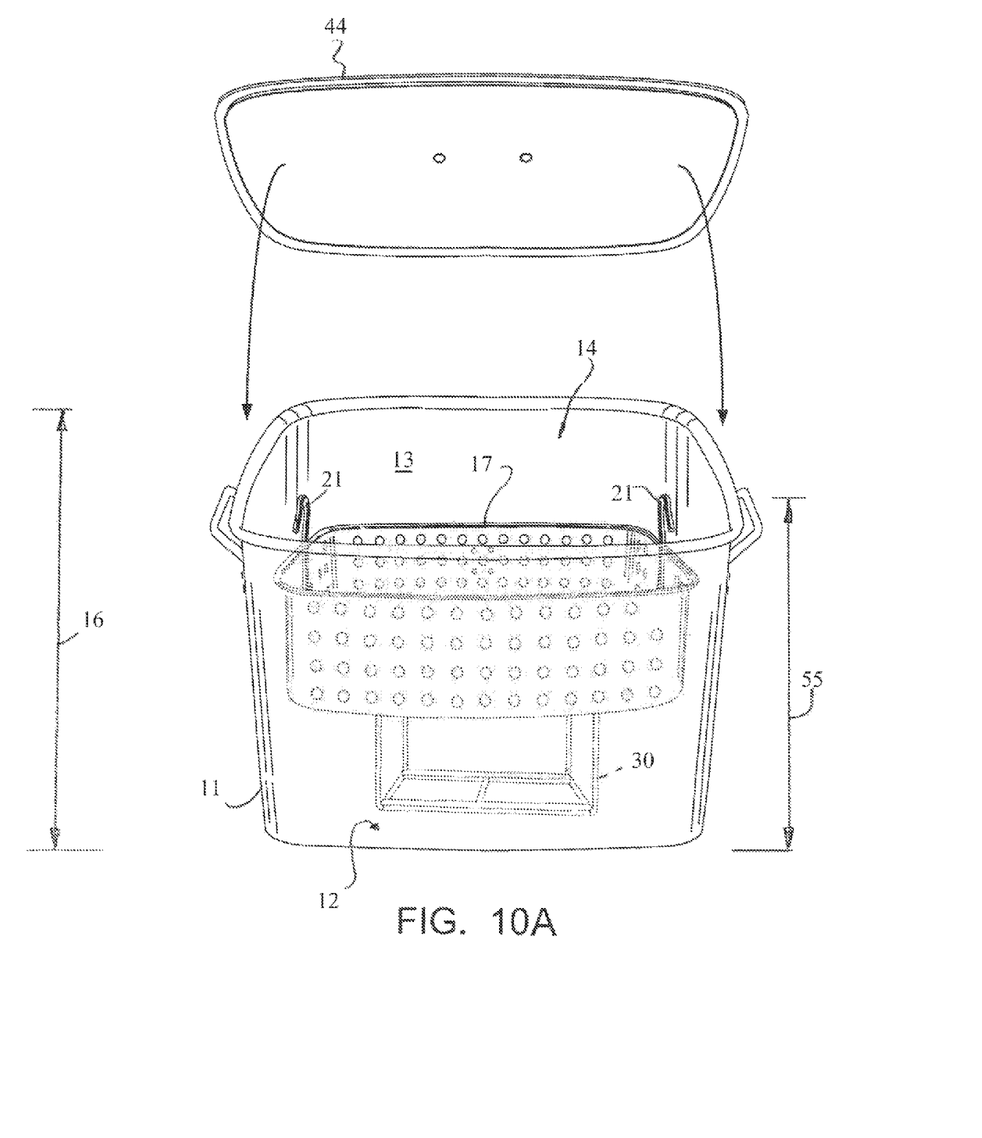
FIGS. 10A-10B are perspective frontal views of a preferred embodiment of the apparatus of the present invention showing a steaming position.
Figure 10B:
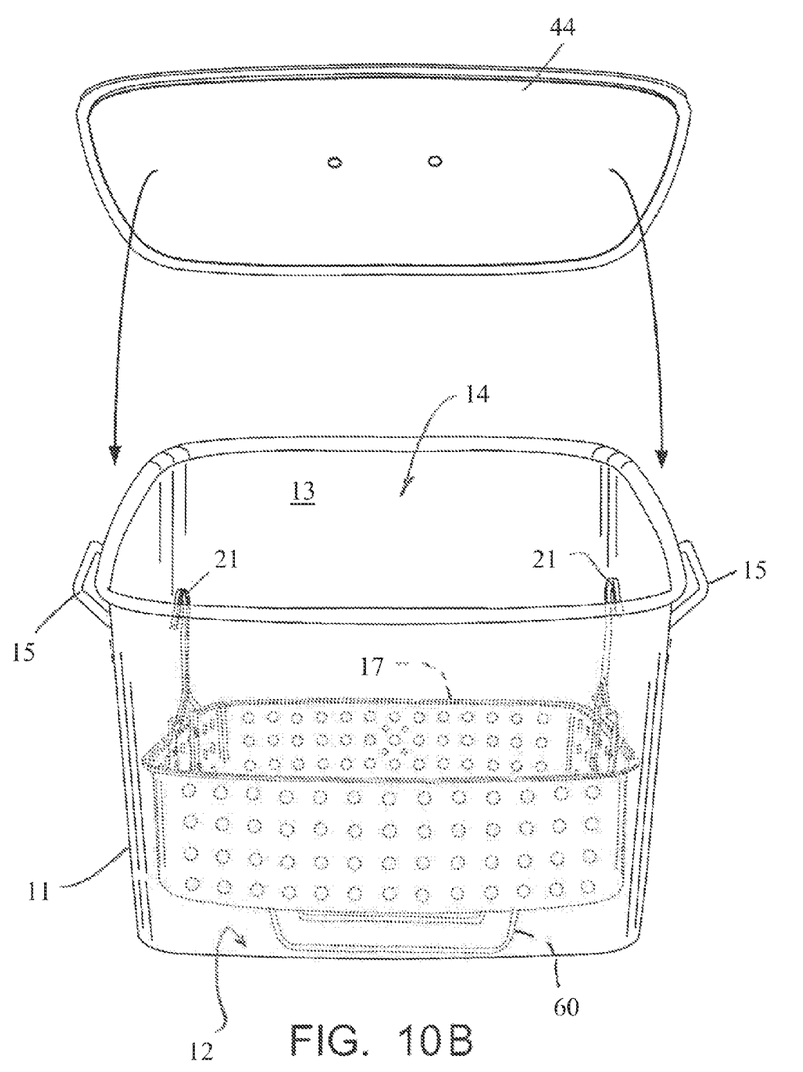
Figure 11:
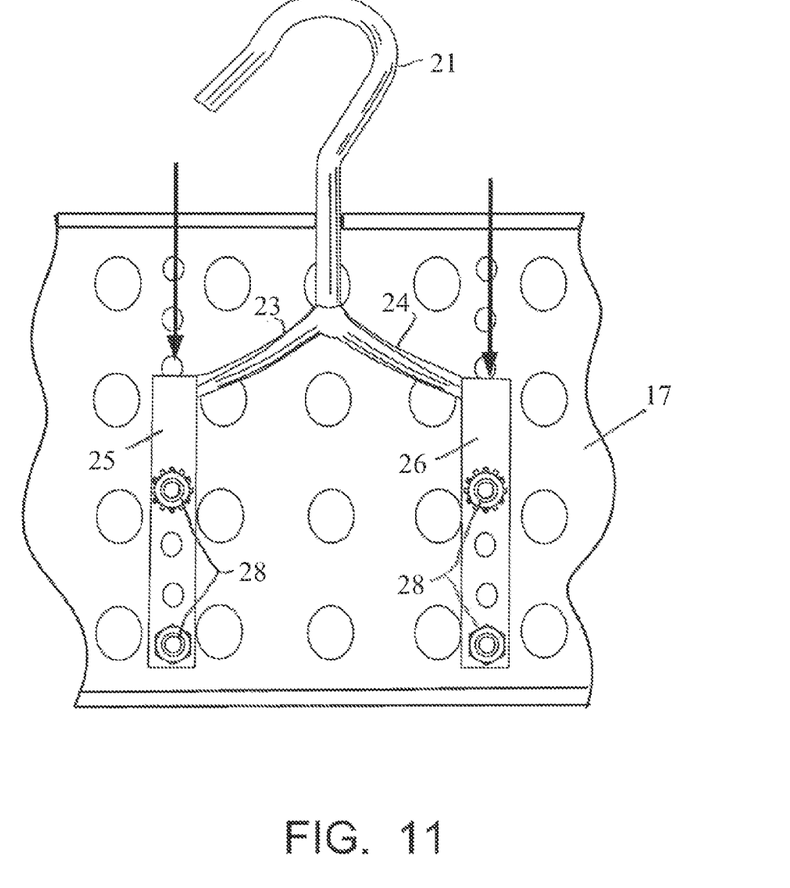
FIG. 11 is a perspective frontal view of a preferred embodiment of the apparatus of the present invention showing the basket and skewer rack in a steaming position.
Figure 12:
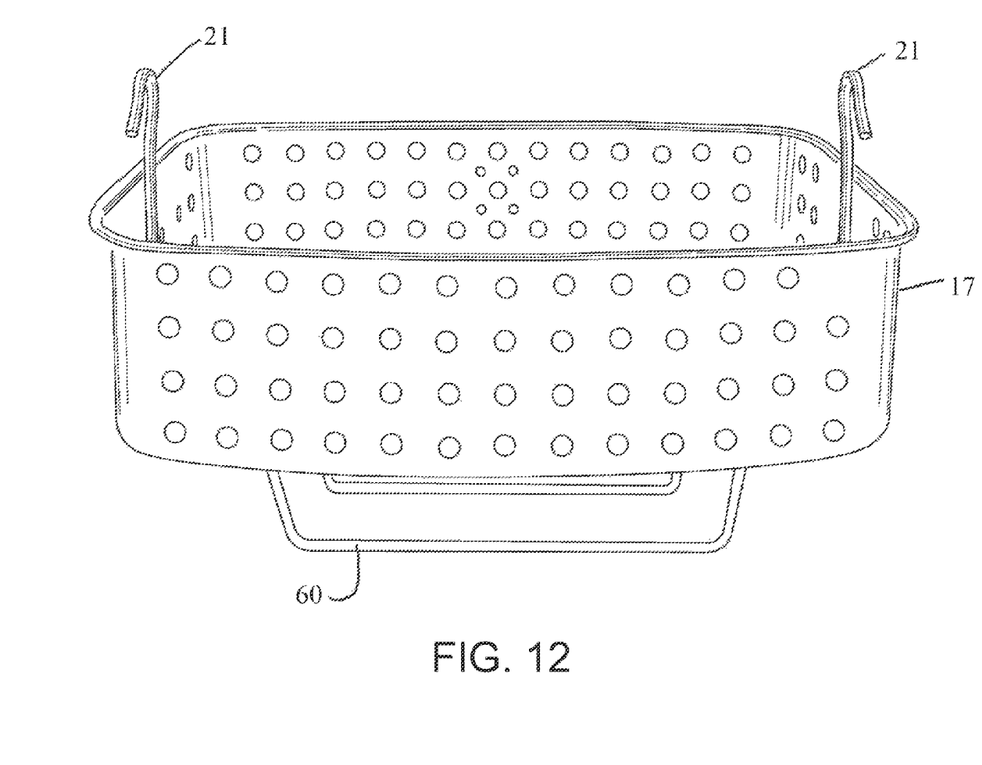
FIG. 12 is a frontal perspective view of a preferred embodiment of the apparatus of the present invention showing the basket and skewer rack in a steaming position.

A user can attach the handles 21 to basket 17 at any number of vertically spaced apart adjustment positions. For example, in FIGS. 1-2, 4-5 and 8, the handles 21 are in an upper position. This position is used when food items are to be fried in oil or boiled in water or other water-based or aqueous cooking solution. FIGS. 9 and 11 shows the handles 21 in a lower position. This position of FIGS. 9-11 is used for steaming food items that are placed in basket 17. Notice in FIGS. 9-11 that when steaming, the combination of rack 30, basket 17 and handles 21 are of a height 55 that is less than the height 16 of pot 11 so that rack 30, basket 17 and handles 21 fit inside of pot 11, covered with lid 44.

Skewer rack 30 is comprised of a base 31 and a plurality of skewer rods 32. Skewer rack base 31 can be comprised of a pair of elongated plates 33, 34 connected with bars 35, 36, 37. Each skewer rod 32 provides an upper opening 38. Opening 38 can have an internally threaded bore 39 that is receptive of a threaded fastener or bolt 40. A bolt or fastener or bolted connection 40 can be used to fasten rack 30 to basket 17 when food items are to be steamed.

Figure 3:
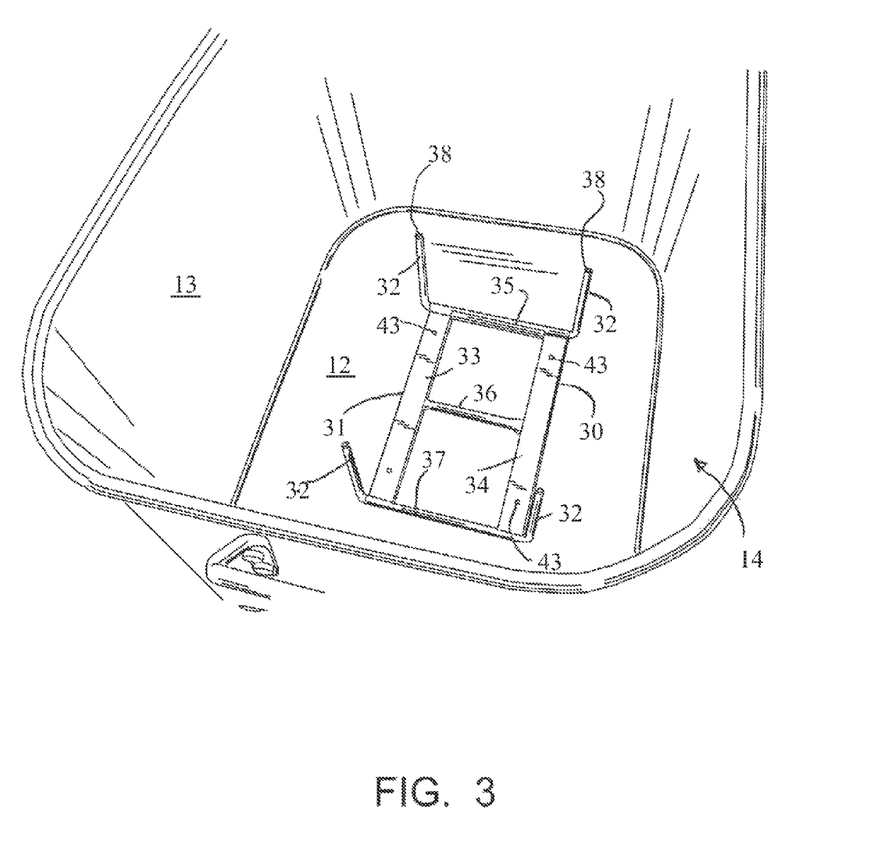
FIG. 3 is a partial perspective view of a preferred embodiment of the apparatus of the present invention.

For steaming, basket 17 provides openings 41 in basket bottom wall 18. Openings 41 enable a bolt 40 to be placed through opening 41 in bottom panel 18 and into the internally threaded bore 39 of opening 38 of each skewer rod 32 (see FIGS. 5-7). In this fashion, the skewer rack 30 can be bolted to the underside of bottom panel 18 of basket 17 when steaming. FIG. 3 shows the position of skewer rack 30 with basket 17 removed. This is the position of skewer rack 30 during steaming, though basket 17 has been removed to show the structure of skewer 30. Pot 11 can be provided with a lid or cover 44 that enables the pot open top 14 to be closed when steaming food items (see FIGS. 10A, 10B).

Figure 4:
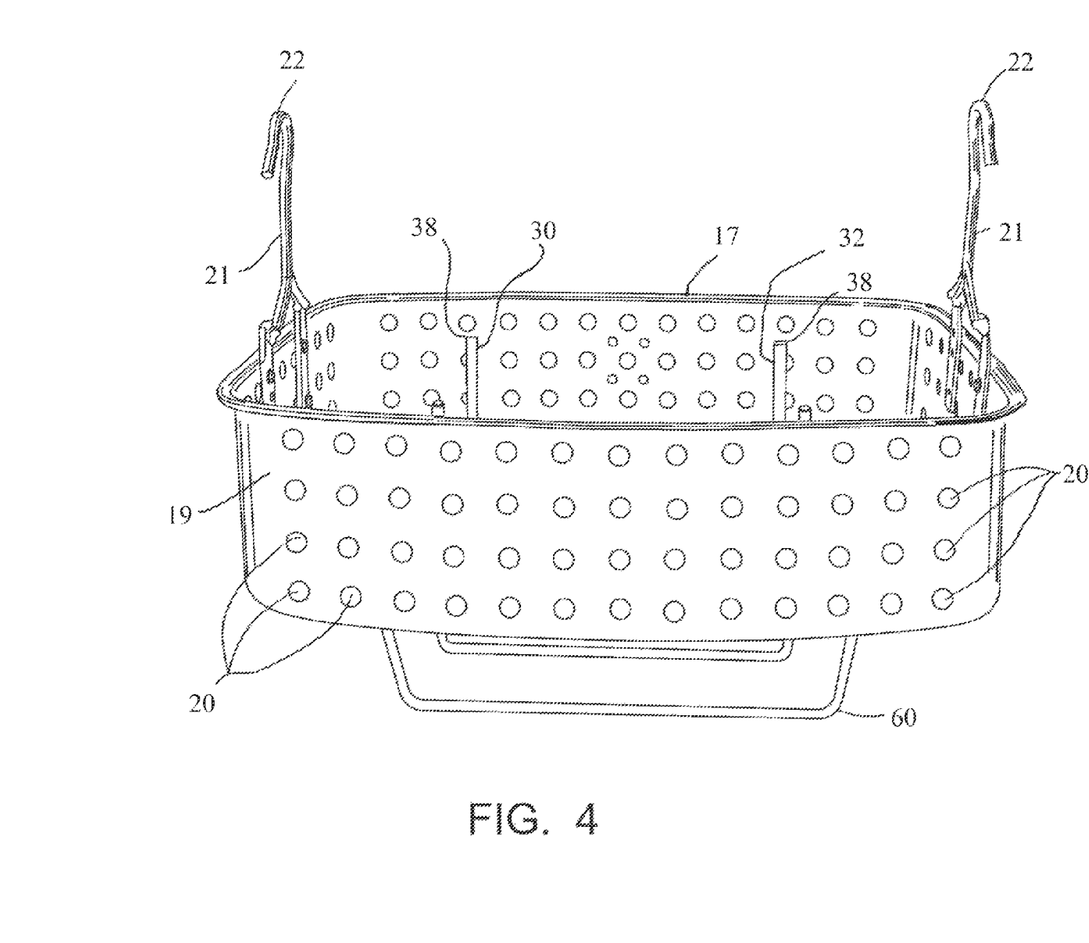
FIG. 4 is a partial perspective top view of a preferred embodiment of the apparatus of the present invention showing the basket and skewer rack.
Figures 5, 6, 7:
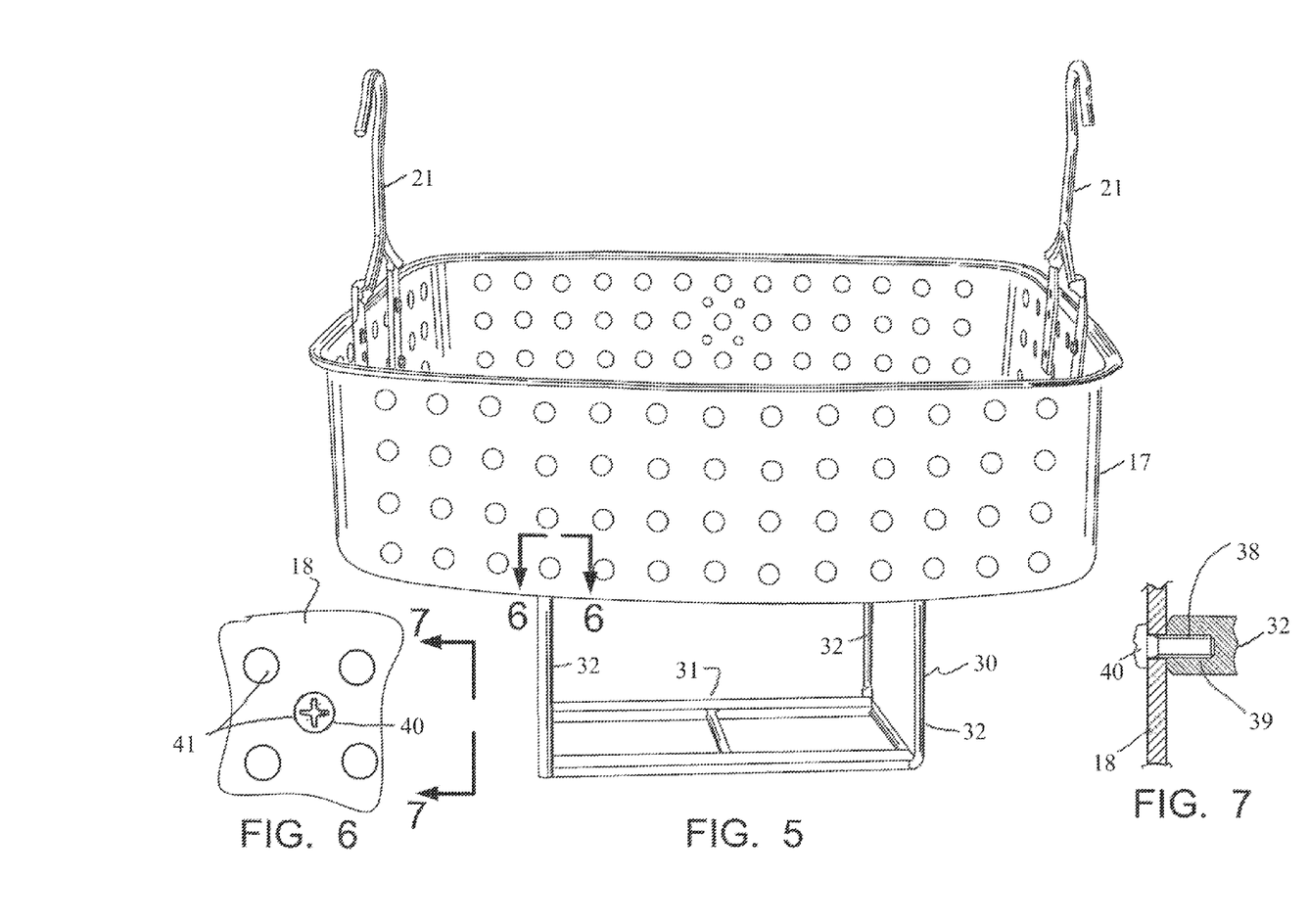
FIG. 5 is a partial end view of a preferred embodiment of the apparatus of the present invention illustrating the basket.
FIG. 6 is a partial perspective view of a preferred embodiment of the apparatus of the present invention.
FIG. 7 is a sectional view of a preferred embodiment of the apparatus of the present invention, taken along lines 7-7 of FIG. 6.
Figure 8:
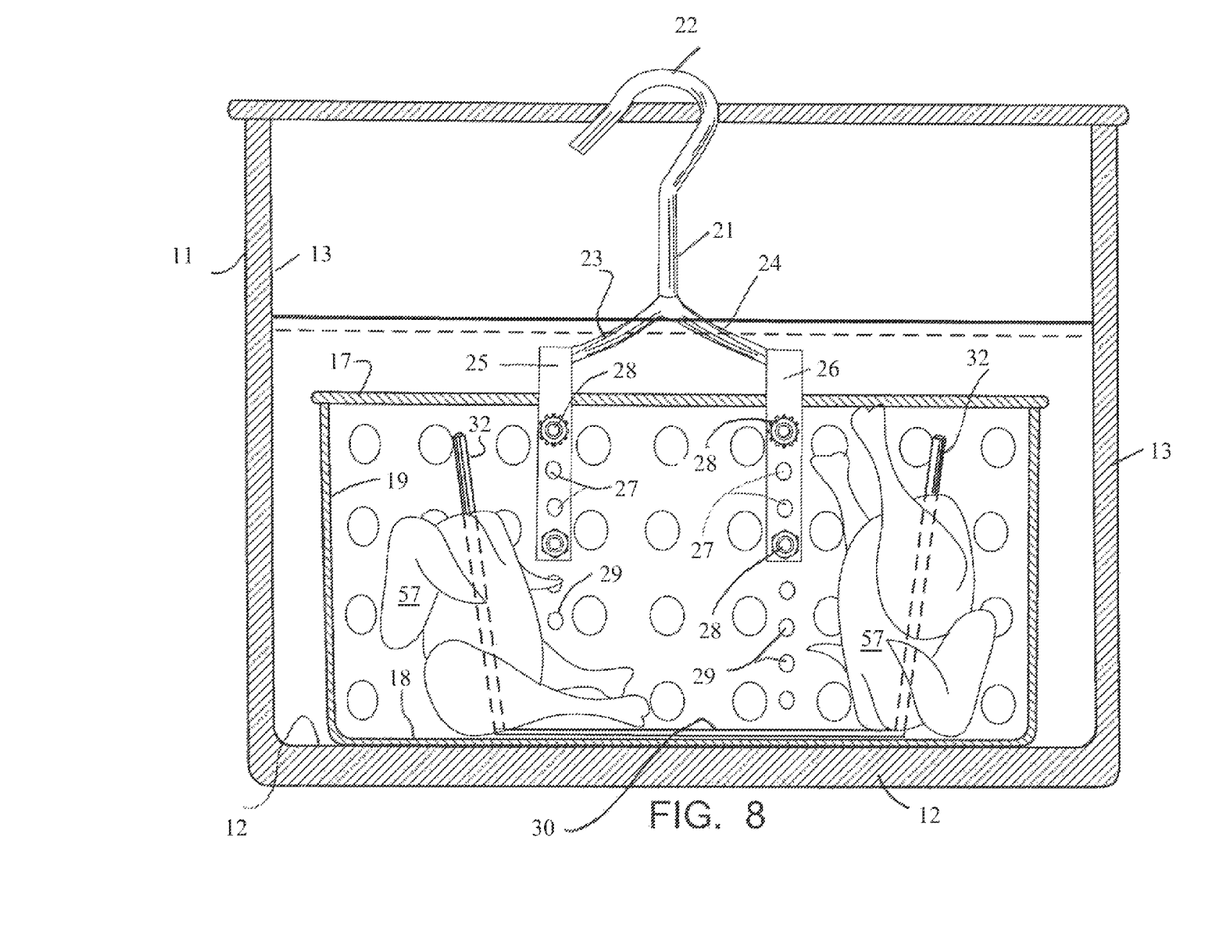
FIG. 8 is a sectional view of a preferred embodiment of the apparatus of the present invention.

Skewer rack 30 provides openings 43 that enable skewer rack 30 to be bolted to the inside surface of basket 17 bottom panel 18 through openings 41 in basket 17 as shown in FIGS. 4, 7 and 8. In this position, the skewer rack 30 can be used to skewer food items such as chickens or other poultry items 57. Each rod 32 is receptive of a chicken or poultry item 57 to be fried. For the frying position seen in FIG. 8, the handles 21 are in an elevated upper position. Skewer rack 30 can be removed from basket 17 when very large food items are to be fried, such as when frying a large poultry item (e.g. turkey).

Figure 1:
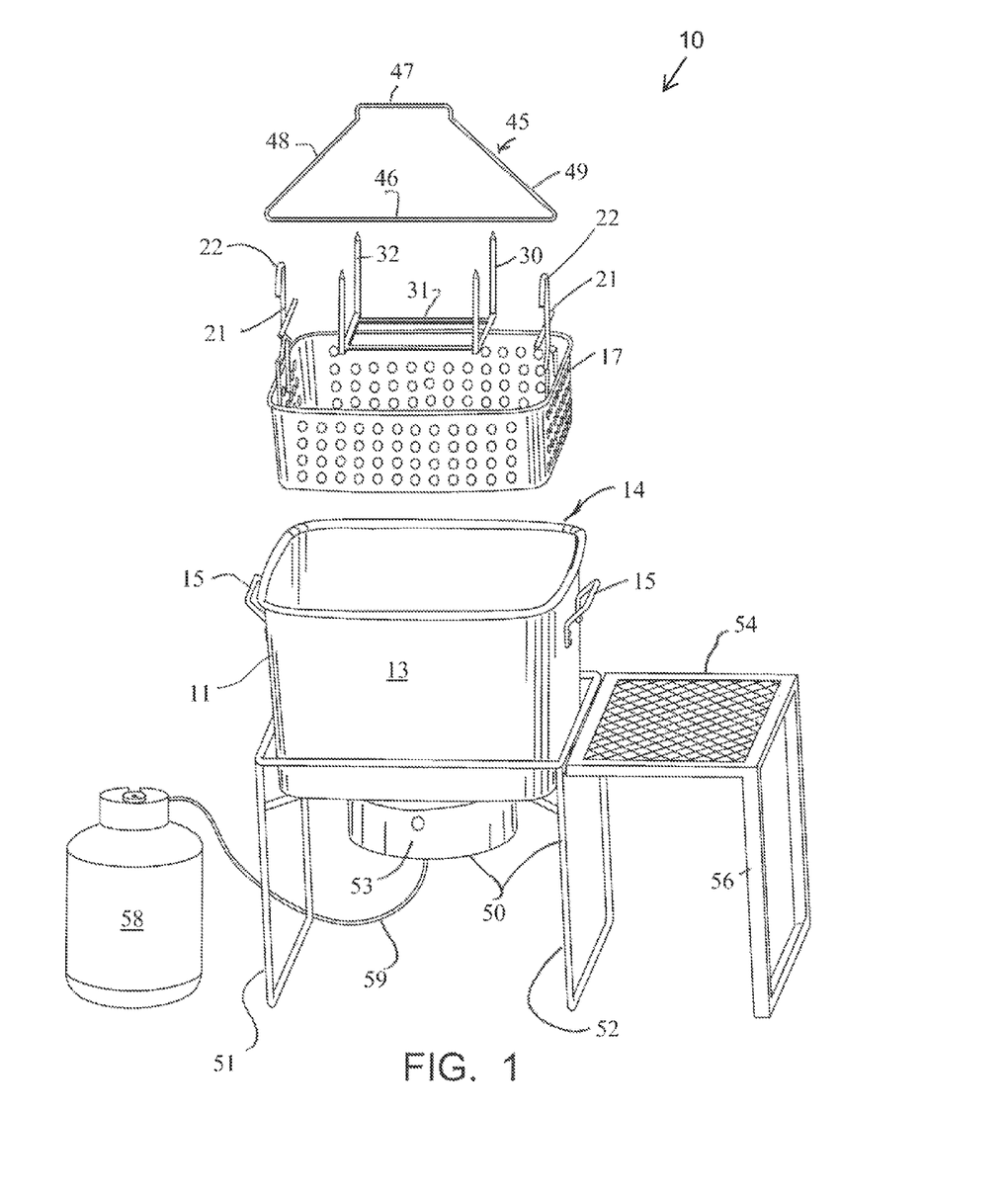
FIG. 1 is an exploded perspective view of a preferred embodiment of the apparatus of the present invention.
Figure 2:
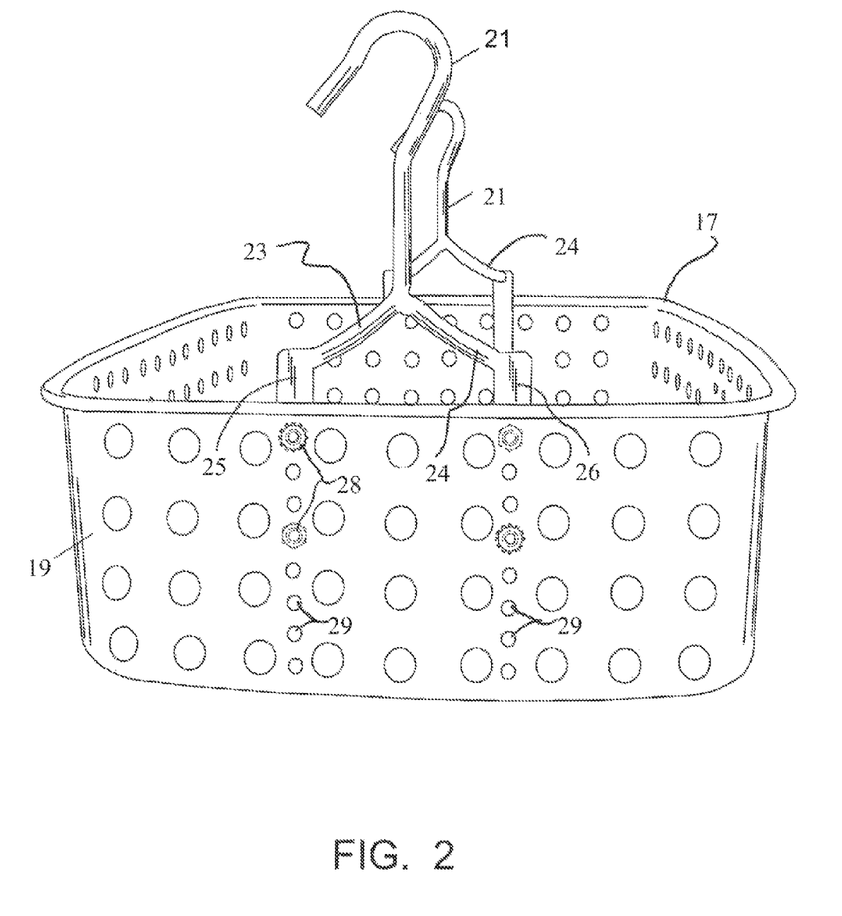
FIG. 2 is a partial perspective view of a preferred embodiment of the apparatus of the present invention.

FIG. 1 shows a lifting device 45 for engaging handles 21 at hooks or inverted hooks 22. Lifting device 45 has lower bar 46, handle or upper bar 47 and diagonal bars 48, 49. A user grasps upper bar or handle 47 and engages hooks 22 with lower bar 46.

Burner 50 can receive pot 11 (see FIG. 1). Burner 50 can include legs 51, 52 and table 54 with leg 56. A burner element (not shown) supplies a flame under pot 11. The burner element can be contained in a wind guard or shroud 53. Fuel can be in the form of canister 58 and hose 59 which connect to the burner element within shroud or wind guard 53.

Figure 3A:
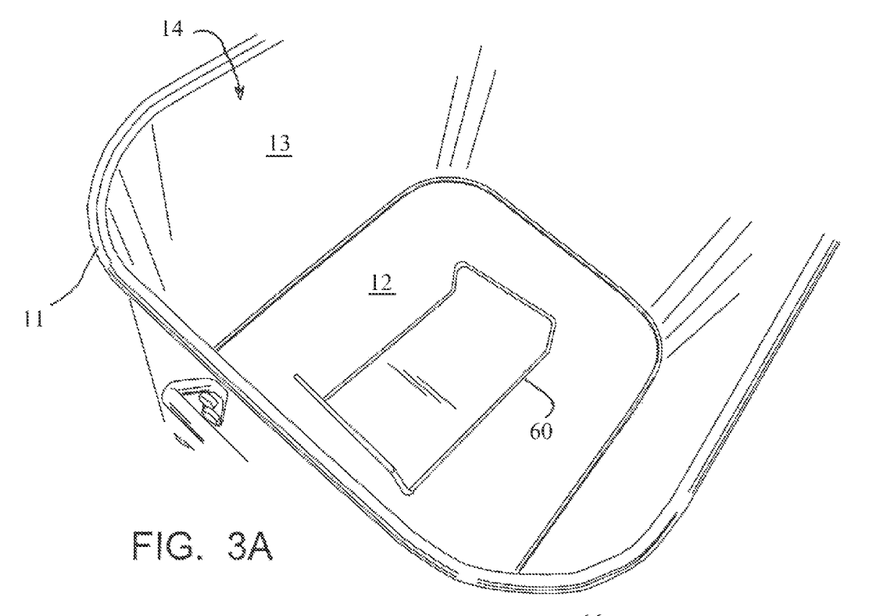
FIG. 3A is a partial perspective view of a preferred embodiment of the apparatus of the present invention, showing an alternate support rack for use when steaming food items.

FIGS. 3A-3B, 4, 9, 10B and 12 show an alternate steaming rack that can be used with the apparatus 10 of the present invention. The steaming rack 60 can be used to support the basket 17 in an elevated position as shown in FIGS. 3A, 4, 9, 10B and 12. The steaming rack 60 differs from the rack 30 in that it is not designed to be bolted or fastened to the basket 17. The rack 60 simply rests upon the pot bottom 12 as shown in FIG. 3A wherein basket 17 is removed for clarity. Rack 60 rests upon pot bottom 12 as shown in FIG. 3A. Basket 17 is then placed upon the steaming rack 60 as shown in FIGS. 4, 9, 10B and 12.

Figure 3B:
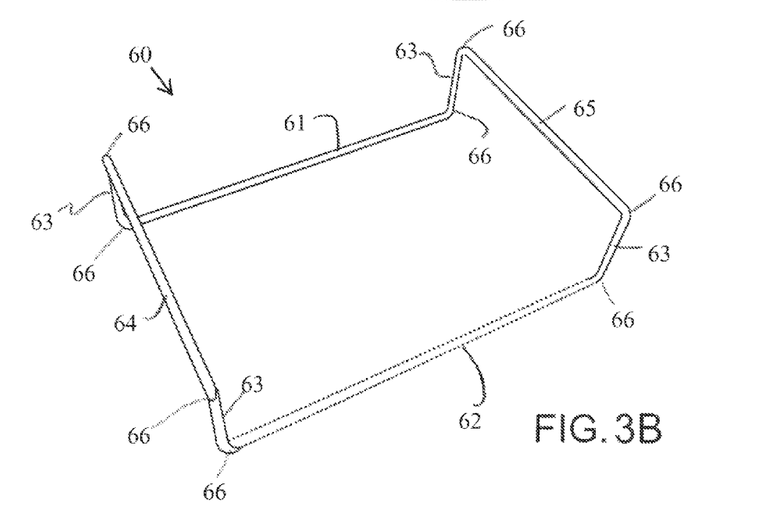
FIG. 3B is a partial perspective view of a preferred embodiment of the apparatus of the present invention, showing an alternate support rack for use when steaming food items.

Steaming rack 60 is comprised of a pair of spaced apart, generally parallel lower horizontal member 61, 62 as shown in FIG. 3B. A plurality of four vertical members 63 are provided. Each lower horizontal member 61, 62 is joined to a pair of vertical members 63 at a bend 66 as shown in FIG. 3B.

The steaming rack 60 provides a pair of spaced apart, upper horizontal members 64, 65. The horizontal member 64, 65 can be generally parallel. The upper horizontal member 64, 65 are each jointed to a pair of vertical members at bends 66 as shown in FIG. 3B.

During use, the lower horizontal member 61, 62 rests upon the pot 11 bottom 12 as shown in FIG. 3A. The basket 17 bottom panel 18 rests upon the upper horizontal member 64, 65. This steaming position can be seen in FIGS. 9, 10B and 12.

The following is a list of parts and materials suitable for use in the present invention.

| PARTS LIST | |
| --- | --- |
| Part Number | Description |
| 10 | cooking apparatus |
| 11 | pot |
| 12 | bottom |
| 13 | side wall |
| 14 | open top |
| 15 | handle |
| 16 | pot height |
| 17 | basket |
| 18 | bottom |
| 19 | side wall |
| 20 | perforation |
| 21 | handle |
| 22 | hook/inverted hook |
| 23 | arm |
| 24 | arm |
| 25 | flange |
| 26 | flange |
| 27 | flange opening |
| 28 | fastener/bolted connection |
| 29 | basket adjustment opening |
| 30 | skewer rack |
| 31 | base |
| 32 | skewer rod |
| 33 | elongated plate |
| 34 | elongated plate |
| 35 | cross bar |
| 36 | cross bar |
| 37 | cross bar |
| 38 | opening |
| 39 | internally threaded bore |
| 40 | bolt/bolted connection/fastener |
| 41 | openings |
| 43 | openings |
| 44 | cover/lid |
| 45 | lifting device |
| 46 | lower bar |
| 47 | handle/upper bar |
| 48 | diagonal member |
| 49 | diagonal member |
| 50 | burner |
| 51 | leg |
| 52 | leg |
| 53 | wind guard/shroud |
| 54 | table |
| 55 | height |
| 56 | leg |
| 57 | chicken/poultry item |

-continued

PARTS LIST

| Part Number | Description |
| --- | --- |
| 58 | fuel canister |
| 59 | fuel hose |
| 60 | steaming rack |
| 61 | lower horizontal member |
| 62 | lower horizontal member |
| 63 | vertical member |
| 64 | upper horizontal member |
| 65 | upper horizontal member |
| 66 | bend |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An outdoor cooking apparatus comprising:
   a) a cooking vessel having a bottom wall, side wall having a side wall upper end, open top and vessel interior;
   b) a basket that is sized and shaped to fit the vessel interior, the basket having a basket side wall that is shorter than the vessel side wall, a bottom panel with an inner surface, an outer surface, and multiple fastener receptive openings, each having a first diameter;
   c) a skewer rack that is connectable to the basket bottom panel, the rack having multiple inclined skewers, each skewer having an upper end with an internally threaded opening;
   d) a plurality of fasteners that are each connectable to said internally threaded opening, each fastener having a head with a second diameter larger than said first diameter;
   e) each fastener having an externally threaded shaft sized and shaped to fit through a said fastener receptive opening, said shaft connectable to a said internally threaded opening;
   f) wherein the rack is selectively connectable to the basket bottom panel inner surface for skewering food items to be cooked in the basket interior when the basket occupies the vessel interior;
   g) wherein the rack is selectively connectable to the basket bottom panel outer surface by connecting each skewer upper end to the basket bottom, wherein the skewer rack supports the basket in an elevated position above the cooking vessel bottom and above the upper end of each skewer but below the vessel side wall upper end; and
   h) wherein the basket enables items to be cooked within the basket when the basket occupies the vessel interior and wherein the skewer rack is not connected to the basket.

2. The outdoor cooking vessel apparatus of claim 1 wherein the basket is perforated.

3. The outdoor cooking vessel apparatus of claim 1 wherein the basket has one or more handles that enable the basket to be lifted.

4. The outdoor cooking apparatus of claim 3 wherein each handle includes a hook portion.

5. The outdoor cooking vessel of claim 1 wherein the basket has a pair of handles that enable the basket to be lifted.

6. The outdoor cooking apparatus of claim 5 wherein each handle includes a hook portion.

7. The outdoor cooking apparatus of claim 5 wherein each handle includes an inverted hook portion.

8. The outdoor cooking vessel of claim 1 wherein the basket has a pair of ends and handles positioned at the ends that enable the basket to be lifted.

9. The outdoor cooking apparatus of claim 8 wherein each handle includes a hook portion.

10. The outdoor cooking apparatus of claim 8 wherein each handle includes an inverted hook portion.

* * * * *